(No Model.)

D. J. SALTSMAN.
LOG TURNER.

No. 306,433. Patented Oct. 14, 1884.

WITNESSES
C. W. Dashiell.
E. G. Siggers

Daniel J. Saltsman
INVENTOR
by C. A. Snow & Co.
Attorneys

N. PETERS. Photo-Lithographer, Washington, D. C.

UNITED STATES PATENT OFFICE.

DANIEL JAMES SALTSMAN, OF BREWTON, ALABAMA.

LOG-TURNER.

SPECIFICATION forming part of Letters Patent No. 306,433, dated October 14, 1884.

Application filed August 20, 1884. (No model.)

*To all whom it may concern:*

Be it known that I, DANIEL J. SALTSMAN, a citizen of the United States, residing at Brewton, in the county of Escambia and State of Alabama, have invented a new and useful Improvement in Log-Turners, of which the following is a specification, reference being had to the accompanying drawings.

This invention relates to improvements in log-turners or devices for turning a log on the log-carriage of a circular-saw mill while the carriage is in motion.

My improved log-turning apparatus comprises a hook or dog attached to one end of a chain that is secured to a drum, roller, or rotary beam which is supported in suitable bearings above the path of the log-carriage, and provided with an arm or lever to which is attached an operating-cord; and the invention consists in the construction and combination of parts, as hereinafter more fully described and claimed.

Figure 1:
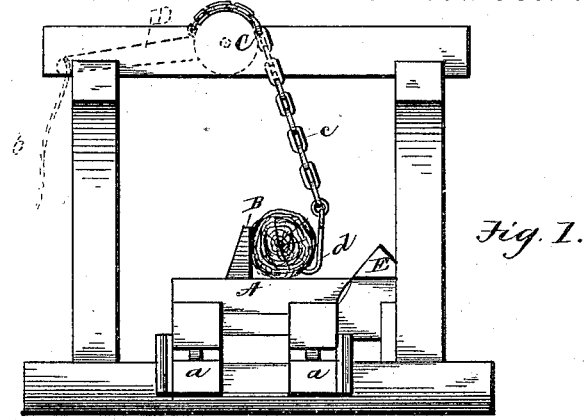
Figure 2:
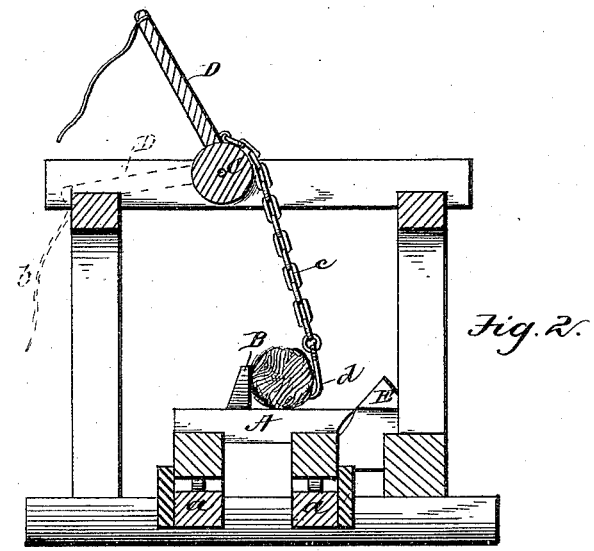
Figure 3:
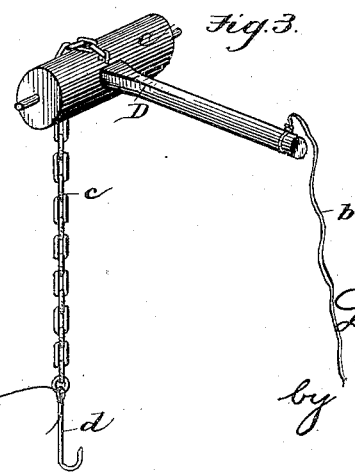

In the accompanying drawings, illustrating the invention, Figure 1 is a side elevation of the log-carriage with the log in position, and showing the application of my devices in turning the log. Fig. 2 is a central cross-section. Fig. 3 is a perspective view of the rotary drum with attached lever, chain, and hook.

Like letters of reference designate like parts in all the views.

A is the log-carriage, which is provided with head-blocks B B, and is moved on ways $a\ a$ by suitable feed mechanism (not shown) in any well-known manner. Above the path of the log-carriage, at a convenient distance from the saw, is journaled a drum, C, that carries an arm or lever, D, to the end of which is attached a cord or rope, $b$, by means of which a partial rotation can be imparted to the drum when required, as will be presently explained. To this drum is attached a chain, $c$, to the free end of which is secured a dog or hook, $d$, for engaging the log to be turned. It will be seen that when this hook or dog is inserted into the side of the log the latter, even though of great size and weight, can be readily turned on the carriage by simply drawing on the cord $b$ so as to take up the slack of the chain $c$. The log is thus turned by the winding of the chain $c$ on the drum C, to which it is attached. When the cord $b$ is released, the weight of the log, reacting on the chain, rotates the drum backward a little distance, and so returns the lever D to its normal or vertically-inclined position. By this simple device logs of great bulk and weight can be easily and rapidly turned while the carriage is in motion. The drum C can be actuated by hand through the cord $b$, or the latter may be connected to the log-carriage, so as to actuate the drum and attached parts automatically.

It will be understood that the chain $c$ is of a length just sufficient to enable the hook or dog $d$ to hang clear under the log on one side. It is only necessary to hold the hook or dog against the side of the log as the carriage comes back, so as to catch the log and turn it just before it passes the saw.

Near one of the ways $a$, on the side of the carriage opposite the head-blocks B B, are two trip-blocks, E E, having beveled surfaces, on which the log falls as it is turned, and from which it rolls back immediately onto the carriage and against the head-blocks.

It is obvious that by lengthening the chain $c$ this apparatus can be used for rolling logs down from a distance to the carriage, as well as for turning them on the carriage.

Having thus described my invention, what I claim as new, and desire to secure by Letters Patent, is—

As an improvement in log-turners, the combination, with the traveling log-carriage A, having the head-blocks B, and the trip-blocks E E opposite the head-blocks, and having beveled or tapered inner surfaces, of a rotary drum, C, journaled in a suitable frame above the path of the carriage, an arm or lever, D, secured to the drum, a cord, $b$, connecting with the arm or lever, a chain or cord, C, attached at one end to the upper face of the drum forward of the lever, and a hook, $d$, at the lower end of the chain, arranged and operating so that the operating of the arm or lever causes the drum to revolve, the chain to partly wind thereon, and the log to turn as the carriage is moved, as set forth.

In testimony that I claim the foregoing as my own I have hereto affixed my signature in presence of two witnesses.

DANIEL JAMES SALTSMAN.

Witnesses:
JAS. T. FOUNTAIN,
T. B. SNOWDEN.